(12) United States Patent
Iguchi (10) Patent No.: US 10,709,217 B2
(45) Date of Patent: Jul. 14, 2020

(54) PERSONAL-ORNAMENT CLASP AND PERSONAL ORNAMENT USING THE SAME

(71) Applicant: MIUMA JEWELRY CO., LTD., Kofu, Yamanashi (JP)

(72) Inventor: Yasuhiro Iguchi, Yamanashi (JP)

(73) Assignee: MIUMA JEWELRY CO., LTD., Yamanashi (JP)

( * ) Notice: Subject to any disclaimer, the term of this patent is extended or adjusted under 35 U.S.C. 154(b) by 0 days.

(21) Appl. No.: 15/736,584

(22) PCT Filed: Jul. 14, 2017

(86) PCT No.: PCT/JP2017/025703
§ 371 (c)(1),
(2) Date: Dec. 14, 2017

(87) PCT Pub. No.: WO2018/189918
PCT Pub. Date: Oct. 18, 2018

(65) Prior Publication Data
US 2018/0352917 A1   Dec. 13, 2018

(30) Foreign Application Priority Data

Apr. 10, 2017   (JP) .................................. 2017-77500

(51) Int. Cl.
*A44C 5/20*   (2006.01)
*A44C 11/00*   (2006.01)
(Continued)

(52) U.S. Cl.
CPC .......... *A44C 11/005* (2013.01); *A44C 5/2038* (2013.01); *A44C 25/001* (2013.01);
(Continued)

(58) Field of Classification Search
CPC ... A44C 5/2019; A44C 5/2023; A44C 5/2028; A44C 5/2033; A44C 5/18; A44C 5/2047; A44C 11/005; A44C 5/20; Y10T 24/4534
See application file for complete search history.

(56) References Cited

U.S. PATENT DOCUMENTS 731,162 A * 6/1903 Carter .................... F16B 45/02
24/599.8
1,746,054 A * 2/1930 Ridabock ............. A44C 5/2095
24/116 A
(Continued)

FOREIGN PATENT DOCUMENTS

JP      3041020      9/1997
JP      9-271407     10/1997
(Continued)

*Primary Examiner* — Emily M Morgan
(74) *Attorney, Agent, or Firm* — Wenderoth, Lind & Ponack, L.L.P.

(57) ABSTRACT

An ornament clasp and an ornament that can be easily attached and detached. The ornament clasp includes a holder (10) on a fixed side having a holding portion (20) where a personal ornament main body (2) is held via an opening (21), a closing member (12) on a movable side rotatably attached to the holder via a pivotal attaching portion (28) and locking form inside the opening to cause a closed state, a soft member attached to the closing member at least on a side of gripping the personal ornament main body, and a spring (13) attached in a repulsive state between the holder and the closing member and pressing the closing member in a direction of closing the opening. A grip space S where the personal ornament main body is gripped in a repulsive direction of the spring is provided between the soft member and the holding portion.

3 Claims, 7 Drawing Sheets

(51) Int. Cl.
   *A44C 25/00*       (2006.01)
   *A44C 15/00*       (2006.01)
(52) U.S. Cl.
   CPC ........ *A44C 15/005* (2013.01); *A44D 2200/10* (2013.01); *Y10T 24/4534* (2015.01)

(56) References Cited

U.S. PATENT DOCUMENTS

| | | | | | |
|---|---|---|---|---|---|
| 4,628,708 | A | * | 12/1986 | Ivey | A44C 11/00 24/3.6 |
| 4,754,534 | A | * | 7/1988 | Helwick | A44C 5/2095 24/116 A |
| 5,117,539 | A | * | 6/1992 | Shrader | A44C 5/2038 24/598.5 |
| 5,687,585 | A | * | 11/1997 | Ferrell | A44C 5/2095 24/116 A |
| 5,832,571 | A | * | 11/1998 | Kanamori | A44C 5/2038 24/599.6 |
| 6,308,385 | B1 | * | 10/2001 | Ball | A44C 5/2033 24/375 |
| 2015/0322996 | A1 | * | 11/2015 | Mitchell | F16B 45/04 24/303 |

FOREIGN PATENT DOCUMENTS

| | | |
|---|---|---|
| JP | 2001-224412 | 8/2001 |
| JP | 2006-325657 | 12/2006 |
| WO | 2016/121088 | 8/2016 |

\* cited by examiner

PERSONAL-ORNAMENT CLASP AND PERSONAL ORNAMENT USING THE SAME

BACKGROUND OF THE INVENTION

1. Technical Field

The present invention relates to a personal-ornament clasp for annually locking a personal ornament such as a necklace to the body and, in particular, to a personal-ornament clasp capable of having a long chain-shaped personal ornament attached to the body while adjusting a retaining position.

2. Description of the Related Art

In general, as necklace clasps, those having an apertured plate and a pulling eye coupled together via retaining rings at both ends of a chain and further having a slide part provided to the chain have been widely available. In addition, as personal ornaments capable of adjusting a retaining position of this type, a personal ornament of Japanese Patent Application Laid-Open No. 10-295421 has been disclosed. This ornament is a personal ornament for an ornamental chain of a necklace, and a cylinder body made of an elastic resin material is provided in an ornamental body. A small hole of the cylinder body is provided smaller than the diameter of the ornamental chain. With this structure, an end of the ornamental chain is inserted into the cylinder body, the ornamental chain is provided so as to be slidable in a locked state, and its locked position is changed to adjust the retaining position at the time of attachment.

A personal-ornament clasp disclosed in Japanese Utility-Model Registration No. 3132896 has an ornamental member main body with an ornament on a front surface, and this ornamental member main body is provided with first and second engaging members which engage with each other. The second engaging member is provided to the first engaging member so as to be rotatable about a fulcrum, and one engaging member is provided with a magnet and the other engaging member is provided with a magnet or a metal member. With this structure, the engaging members are provided so as to be engageable with each other, and a long personal ornament main body is retained in a space portion between the engaging members in a state in which its retaining position is adjustable.

SUMMARY OF THE INVENTION

1. Technical Problem

However, in the generally-available clasp formed of a pulling eye, an apertured plate, and a slide part, in a state in which a pin of the pulling eye is pulled, the pin is inserted into the hole of the plate and, furthermore, the slide part of the chain has to be adjusted to adjust an annular ring of the chain, thereby forcing an extremely burdensome clasp work. In particular, these points are important problems for the elderly at the time of use of a necklace, and development of a clasp of a necklace with these problems solved has been highly desired. Also, in the personal ornament of JP 10-295421, the ornamental chain and the cylinder body are provided so that they can be locked by insertion and detachment of the ornamental chain into and from the cylinder body. To satisfy this, the small hole of the cylinder body is provided so as to be smaller than the diameter of the ornamental chain. Thus, attachment and detachment take efforts, and attachment cannot be made with one touch. Moreover, when the ornamental chain is slid to be repeatedly inserted into and detached from the cylinder body made of the resin material, the cylinder body is intensely exhausted, thereby raising the possibility of weakening the locking force and damaging the ornamental chain. To acquire a predetermined locking force, the cylinder body is elongated, and the size of the ornamental body is increased, thereby losing a balance between the ornamental chain and the ornamental body and degrading entire ornamental properties.

Also for the personal-ornament clasp of JP 3132896, since the magnet and the metal member are provided to the ornamental member main body for engagement, the size of the ornamental member main body is increased to lose integration with the chain and impair ornamental properties. In this clasp, the personal ornament main body is provided by a pearl necklace. With this pearl having a size not passable through the space portion provided in an arc portion of the engaging members, the retaining position can be adjusted. In this manner, this clasp does not have a structure in which the ornamental member main body is directly nipped and attached by the engaging members. Thus, if the ornamental member main body is a thin chain, looseness may occur between the clasp and the ornamental member main body to deviate the retaining position to decrease attachability.

The present invention was developed to solve the above-described circumstances, and has an object of providing a personal-ornament clasp and a personal ornament using the same which solve burdensome handling of the conventional clasp all at once, the personal-ornament clasp being able to easily attach and detach a long personal ornament to and from the body with one touch while adjusting a retaining position, in which even if the personal ornament is a thin chain, this personal ornament is strongly gripped without damage to hold the attachment position, thereby allowing prevention of a deviation, and an attachment/detachment portion is made compact to exert excellent ornamental properties.

2. Solution to the Problem

To achieve the object described above, the invention is directed to a personal-ornament clasp including: a holder on a fixed side having, on one end side, an arc-shaped holding portion where a long chain-shaped personal ornament main body is held via an opening; a closing member on a movable side rotatably attached to the holder via a pivotally attaching portion on another end side with the opening side and locking from inside the opening to cause a closed state; a soft member attached to this closing member at least on a side of gripping the personal ornament main body; and a spring attached in a repulsive state between the holder and the closing member and pressing the closing member in a direction of closing the opening, wherein a grip space where the personal ornament main body is gripped in the repulsive direction of the spring is provided between the soft member and the holding portion.

A second aspect of the invention is directed to the personal-ornament clasp in which the soft member is made of silicone or rubber with friction resistance, and is attached in a state of slightly protruding from the closing member to the grip space.

A third aspect of the invention is directed to the personal-ornament clasp in which the soft member is formed in a flat shape, and is fitted into the closing member as being surrounded inside.

A fourth aspect of the invention is directed to a personal-ornament clasp including: a holder on a fixed side having, on one end side, an arc-shaped holding portion where a long chain-shaped personal ornament main body is held via an opening; a closing member on a movable side rotatably attached to the holder via a pivotally attaching portion on another end side with the opening side and locking from inside the opening to cause a closed state; a soft member attached to an inner periphery of the holding portion; and a spring attached in a repulsive state between the holder and the closing member and pressing the closing member in a direction of closing the opening, wherein a grip space where the personal ornament main body is gripped is provided between the soft member and the closing member.

A fifth aspect of the invention is directed to the personal-ornament clasp in which the soft member is made of silicone or rubber with friction resistance.

A sixth aspect of the invention is directed to the personal-ornament clasp in which a personal ornament using a personal-ornament clasp in which the personal-ornament clasp is provided on one end side of a personal ornament main body.

A seventh aspect of the invention is directed to the personal ornament using the personal-ornament clasp in which an ornamental member larger than the grip space is attached to another end side of the personal ornament main body.

3. Advantageous Effects of the Invention

With the present invention, bothersome handling in conventional clasps for necklaces is totally eliminated. Specifically, the clasp includes: the holder on the fixed side having, on one end side, the arc-shaped holding portion via the opening; a closing member locking from inside the opening via the pivotally attaching portion to cause a closed state; the soft member attached to the closing member on the gripping side; and the spring which repulsively presses the holder and the closing member in the closing direction, and the personal ornament main body is provided in the grip space between the soft member and the holding portion so as to be able to be gripped by the resilient force of the spring. Thus, against the resilient force of the spring, a light pressing force is applied to the holder and the closing member as being nipped by fingers to cause the grip space to become in an open state, and the personal ornament main body is dropped into this grip space from the opening. This allows a desired position of this personal ornament main body to be set. In this state, if the fingers are detached from the holder and the closing member to release the pressing force, the long personal ornament main body can be easily attached with one touch while being adjusted at any retaining position. After attachment, the personal ornament main body is gripped between the soft member and the holding part by the resilient force of the spring. Even if the personal ornament main body is a thin chain, this personal ornament main body is strongly gripped without damage via the elastic force and the friction resistance of the soft member, and the attachment position of the personal ornament main body is held to prevent a deviation and dropping. With the combination of the holding portion and the closing member, integration with the chain can be improved by taking the entirety as a thin, long subject. Furthermore, the holder and the closing member do not spread outward after gripping of the personal ornament main body, chains with different thicknesses can also be supported while the entire ornament properties are kept, and a compact personal-ornament clasp excellent in beauty of function can be provided. In particular, in accordance with the present invention, a pulling eye, a plate, and a slide part, which are imperative parts for conventional clasps, are not required at all. Furthermore, conventional burdensome works are not required, and fastening with the clasp can be easily made with extreme simplicity at a free position of the chain with one action. Compared with the conventional techniques, a clasp and a personal ornament therewith having extremely high commercial values can be provided.

The soft member is made of silicone or rubber, thereby allowing the personal ornament main body to be attached and detached without damaging its surface. With this soft member attached in the state of slightly protruding to the grip space, gripping can be made while this soft member is reliably in contact with the personal ornament main body, the personal ornament main body is firmly held by friction resistance of the soft member to prevent a deviation and dropping after attachment, and fitness to the body can be maintained.

The closing member is fabricated by press working or the like and simultaneously the soft member can be attached to the inside of this closing member. Thus, mass production can be made while the number of components and the number of processes are reduced. At this time, the soft member can be attached at an accurate position, its looseness or dropping after attachment are also prevented, and assembling is also performed with ease.

The clasp includes: the holder on the fixed side having, on one end side, the arc-shaped holding portion via the opening; a closing member locking from inside the opening via the pivotally attaching portion to cause a closed state; the soft member attached to the inner periphery of the holding portion; and the spring which repulsively presses the holder and the closing member in the closing direction, and the personal ornament main body is provided in the grip space between the soft member and the holding portion so as to be able to be gripped. Thus, against the resilient force of the spring, a pressing force is applied to the holder and the closing member as being nipped by fingers to cause the grip space to become in an open state, and the personal ornament main body is dropped into this grip space from the opening. This allows a desired position of this personal ornament to be set. In this state, if the fingers are detached from the holder and the closing member to release the pressing force, the long personal ornament main body can be easily attached with one touch while being adjusted at any retaining position. After attachment, the personal ornament main body is gripped between the soft member and the holding part. Even if the personal ornament main body is a thin chain, this personal ornament main body is strongly gripped without damage via the elastic force and the friction resistance of the soft member, and the attachment position of the personal ornament main body is held to prevent a deviation and drop. With the combination of the holding portion and the closing member, integration with the chain can be improved by taking the entirety as a thin, long subject. Furthermore, the holder and the closing member do not spread outward after gripping of the personal ornament main body, chains with different thicknesses can also be supported while the entire ornament properties are kept, and a compact personal-ornament clasp excellent in beauty of function can be provided.

The soft member is made of silicone or rubber, thereby allowing the personal ornament main body to be attached and detached without damaging its surface. After attachment of the personal ornament main body, the personal ornament main body is firmly held by friction resistance of the soft member to prevent a deviation and dropping after attachment, and fitness to the body can be maintained.

The personal ornament main body can be easily attached to and detached from the body with one touch while the retaining position is adjusted. After attachment, the attachment state fitted to the body can be maintained. Various ornamental properties can be added to the personal ornament main body, and the personal ornament main body can be formed at any length, thereby extending the range of ornamentation.

The ornamental member larger than the grip space is provided to the other end side of the clasp of the personal ornament main body. Even if a force in a dropping direction is applied to the other end side after attachment to the body, the ornamental member engages with the holder, thereby preventing its dropping to prevent falling from the body. This ornamental member further enhances ornament properties as a personal ornament.

DETAILED DESCRIPTION OF EMBODIMENTS OF THE INVENTION

Figure 1:
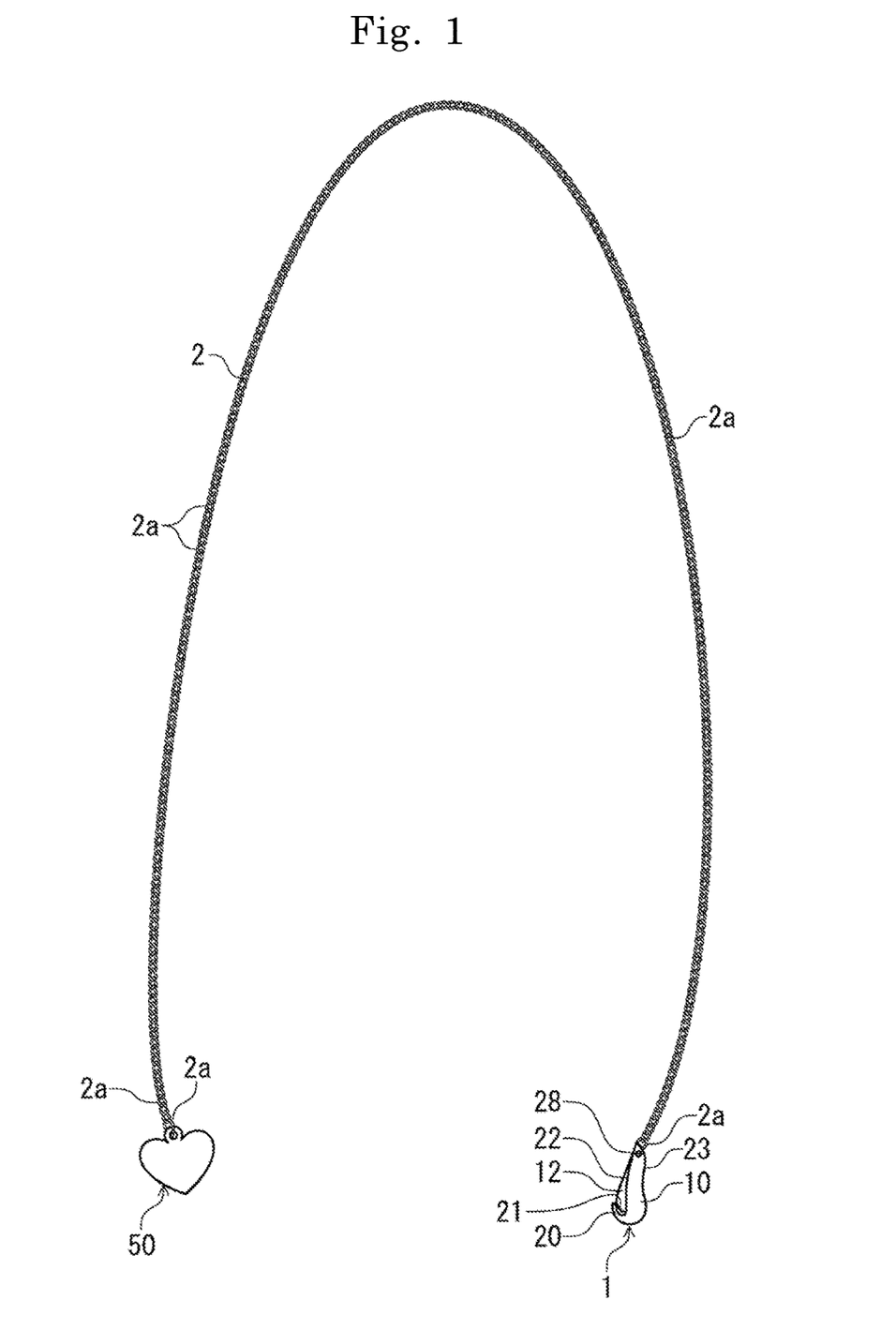
FIG. 1 is an external view depicting an embodiment of a personal ornament.
Figure 2:
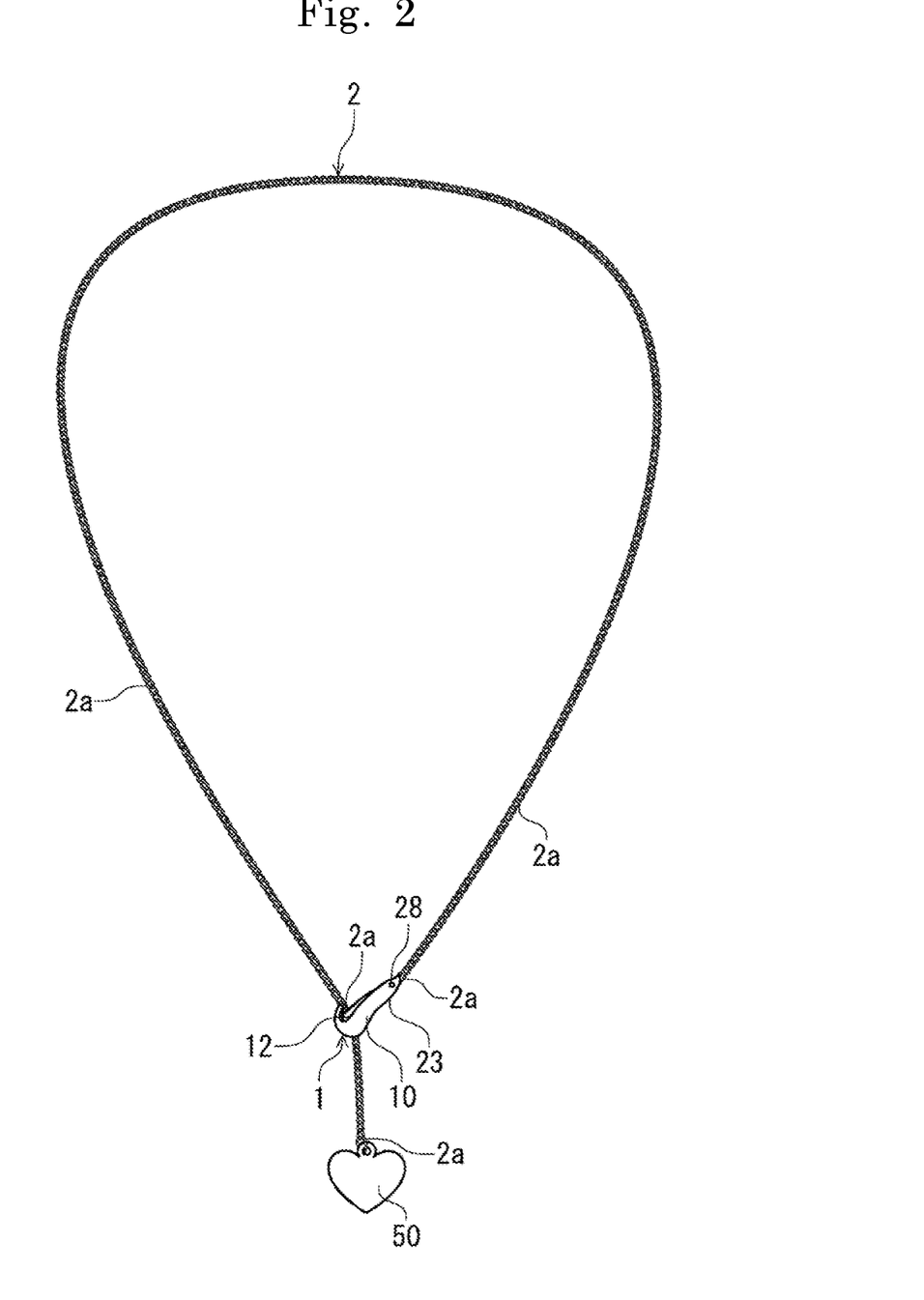
FIG. 2 is an external view depicting an attached state of the personal ornament of FIG. 1.
Figure 3A:
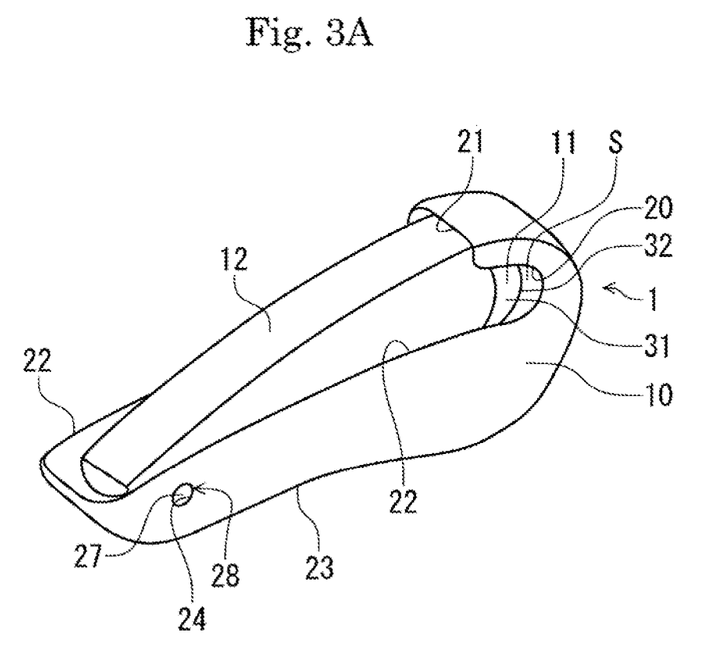
FIG. 3A and FIG. 3B are perspective views depicting a first embodiment of a personal-ornament clasp in the present embodiment.
Figure 3B:
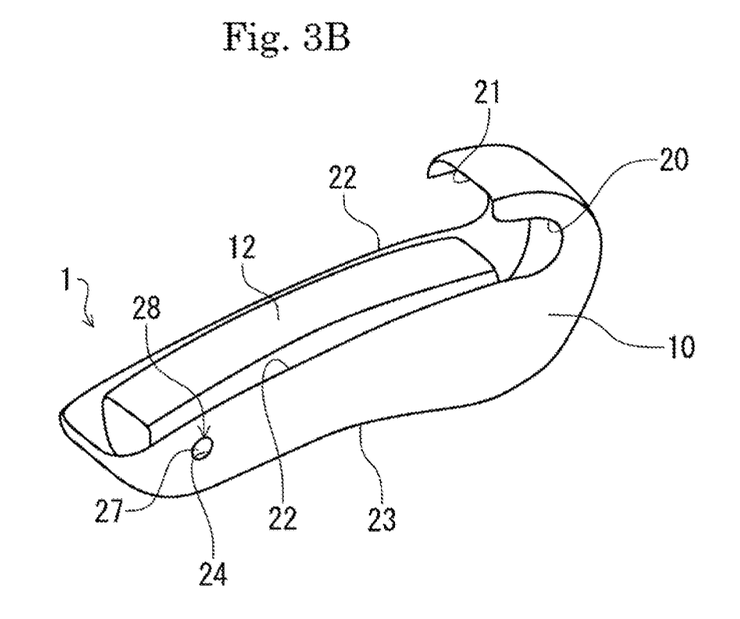

In the following, embodiments of the personal-ornament clasp and the personal ornament using this in the present invention are described based on the drawings. Depicted in FIG. 1 is an embodiment of the personal ornament using the personal-ornament clasp of the present invention, depicted in FIG. 2 is an attached state of the personal ornament, and depicted in FIGS. 3A to 3B is a personal-ornament clasp for use in this personal ornament.

The personal-ornament clasp in the present invention (hereinafter referred to as a clasp main body 1) is attached to a personal ornament main body 2 formed of a long chain-shaped necklace depicted in FIG. 1 and FIG. 2. With this clasp main body 1, the personal ornament main body 2 is annularly connected to be provided attachably to and detachably from the body.

In FIGS. 3A to 3B, FIGS. 4A to 4C, FIG. 5, the clasp main body 1 includes a holder 10, a soft member 11, a closing member 12, and a spring 13.

The holder 10 is provided from an appropriate precious metal or metal material with ornamental properties so as to have a substantially hook-formed outer shape having a substantially U-shaped cross-section, and is provided as a side for fixing the personal ornament main body 2. On one end side to which the personal ornament main body 2 is attached, an arc-shaped holding portion 20 is formed. On an opening side of this holding portion 20, an opening 21 is provided.

The opening 21 is formed so as to be able to attach and detach the personal ornament main body 2 to and from the holding portion 20 and be slightly wider than the thickness of this personal ornament main body 2. Via this opening 21, the personal ornament main body 2 can be held in the holding portion 20. Between the holder 10 and the closing member 12 to which the soft member 11 is attached, a grip space S, which will be described further below, is provided. In this grip space S, the personal ornament main body 2 is attached to the holding portion 20 via the soft member 11.

On the holder 10, a curved surface end 22 forming a mild curved surface is formed so as to be continued from the holding portion 20. Via this curved surface end 22, the personal ornament main body 2 can be guided to the holding portion 20 from the opening 21. On an opposite side of the curved surface end 22 of the holder 10, a bowed portion 23 with a portion near its center recessed is formed. Also, on the other end side of the attachment side of the personal ornament main body 2, two communication holes 24, 24 are formed so as to cross an open and close direction of the closing member 12. Furthermore, at an end side from these communication holes 24, an attachment hole 25 for attaching a fixing side of the personal ornament main body 2 is formed.

Figure 4A:
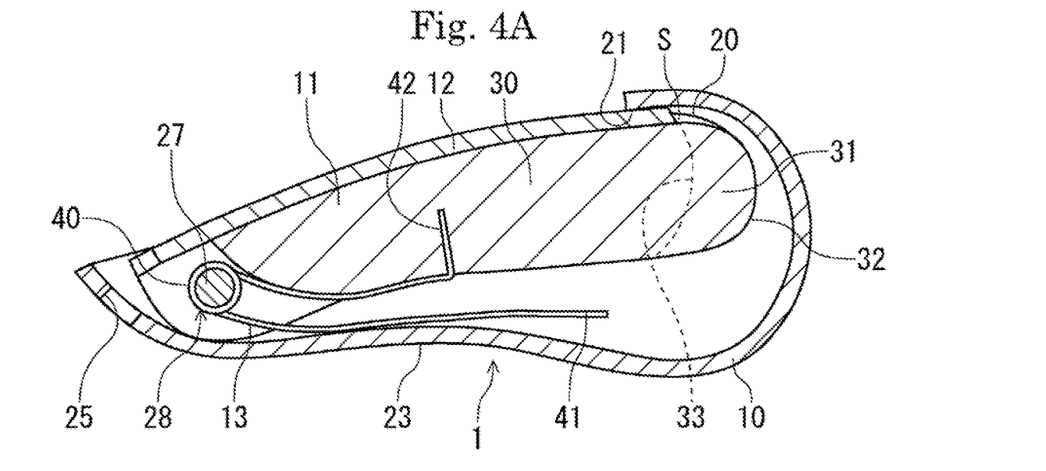
FIG. 4A to FIG. 4C are longitudinal sectional views of the personal-ornament clasp of FIG. 3A and FIG. 3B.
Figure 4B:
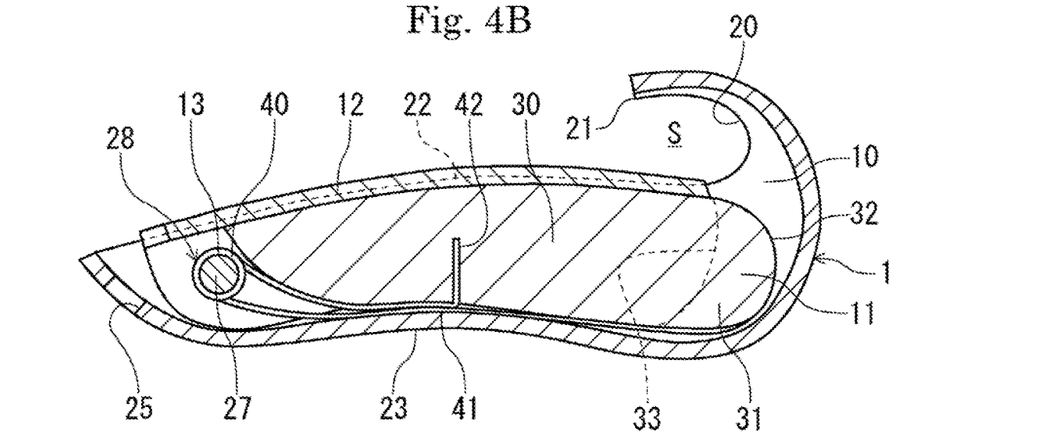
Figure 4C:
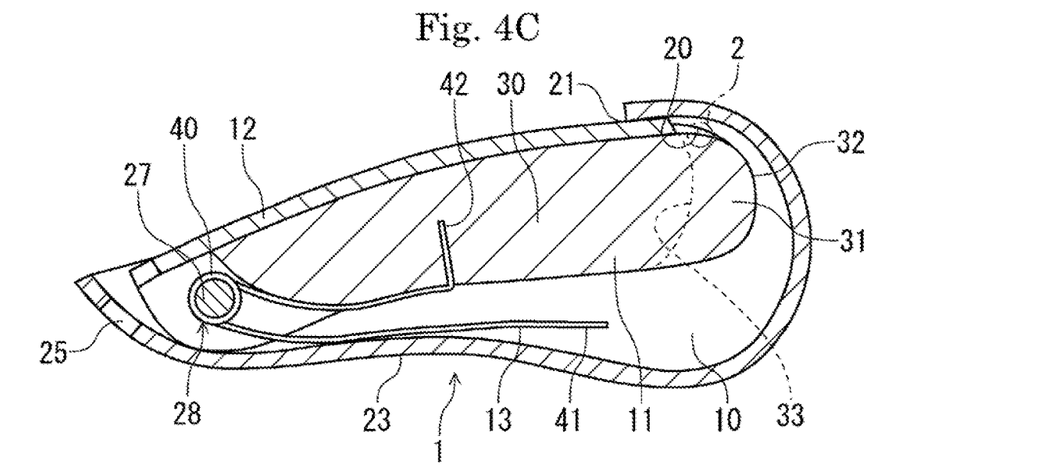

The closing member 12 has a curved-surface shape on its upper surface side and a bowed shape on its lower surface side as shown in FIGS. 4A to 4C, and is formed to have a U-shaped cross section which can be accommodated inside the holder. Inside this U-shaped portion, the soft member 11 is attached. Through holes 26 are formed at positions of the closing member 12 corresponding to the communication holes 24. With these through holes 26 communicated with the communication holes 24, the closing member 12 is temporarily attached to the holder 10, and a pin 27 is inserted into these communication holes 24 and the through holes 26. Both ends of the pin 27 are fixed to the holder 10 by swaging, laser welding, or the like, thereby providing a pivotally attaching portion 28.

In this manner, the closing member 12 is rotatably attached to the holder 10 as a movable side via the pivotally attaching portion 28 on the other end side with the opening 21, and has its tip side lockable from the inside of the opening 21. When the closing member 12 and the holder 10 are pressed by manual operation in a direction of nipping both, the closing member 12 rotates about the pivotally attaching portion 28, locking of the closing member 12 tip side to the opening 21 is released, and the opening 21 can be opened.

The holder 10 and the closing member 12 are each made of, for example, a thin-plate-shaped precious metal such as 18K or silver having a thickness of 0.1 mm, and are each integrally fabricated by processing means such as press working.

Figure 5:
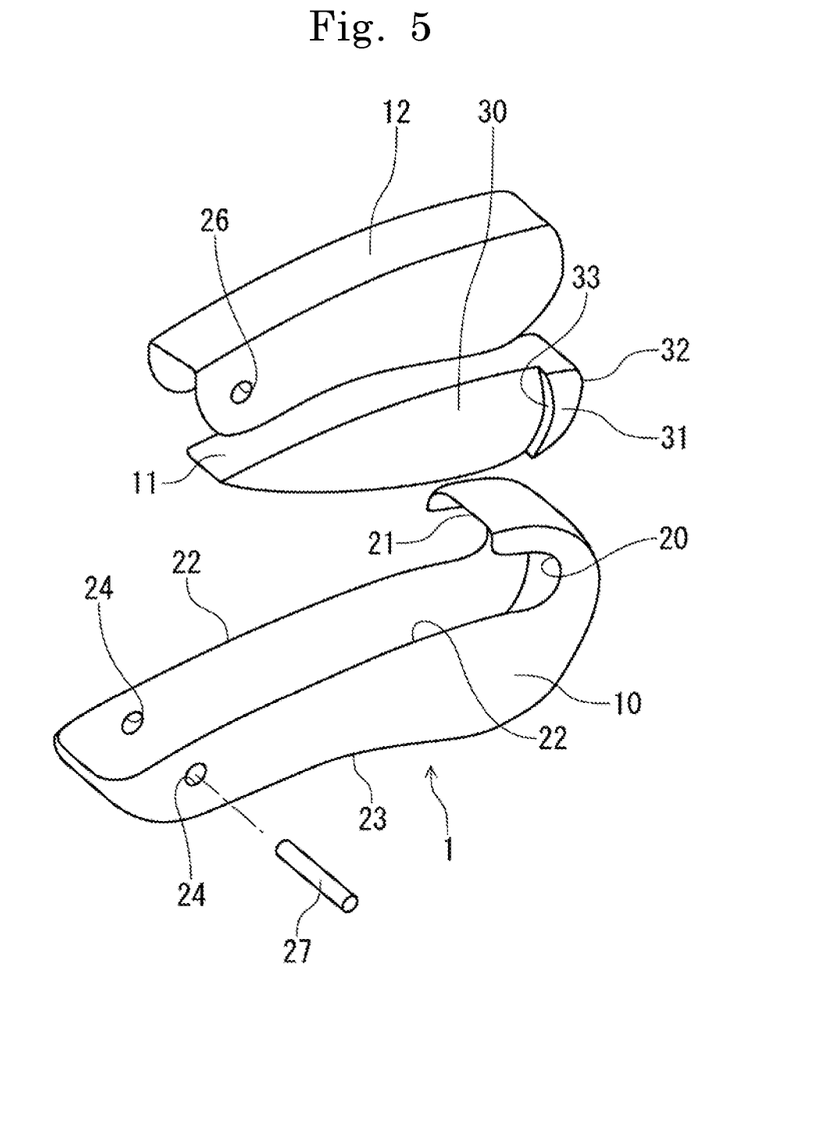
FIG. 5 is a partially-omitted separated view of the personal-ornament clasp of FIG. 3A and FIG. 3B.

The soft member 11 of FIG. 5 is formed of silicone with friction resistance to be long in a flat shape including a plate-shaped portion 30 and a broad portion 31 broader than this plate-shaped portion 30. Formed of silicone, the soft member 11 has a hardness that will allow the personal ornament main body 2 to dig thereinto.

The plate-shaped portion 30 is formed so as to have a thickness capable of fitting inside an inverted-C shape of the closing member 12. The broad portion 31 is formed on front and rear surfaces at the tip side (right side in FIG. 4A) of the plate-shaped portion 30 so as to have a thickness that is substantially equal to the width of the closing member 12. On the tip side of the broad portion 31, an appropriate smooth convex arc portion 32 is formed. On the rear end side of the broad portion 31, a concave arc portion 33 capable of engaging with the tip side of the closing member 12 is formed.

The soft member 11 is fitted into the closing member 12 in a state in which the plate-shaped portion 30 is surrounded inside, the concave arc portion 33 engages with a tip face of the closing member 12, and the convex arc portion 32 of the broad portion 31 is attached by means such as bonding to the closing member 12 in a state of slightly protruding (bulging) into the grip space S. This makes the soft member 11 attached so as to protrude from at least a side of the closing member 12 for gripping the personal ornament main body 2.

The spring 13 of FIGS. 4A to 4C is made of a torsion coil spring, and has a coil portion 40, a free end 41 on one end side across this coil portion 40, and a folded portion 42 on the other end side. In a state in which the coil portion 40 is attached to the pivotally attaching portion 28, the free end 41 is in contact with the inner surface of the closing member 12, and the folded portion 42 pierces through the soft member 11, the spring 13 is attached between the holder 10 and the closing member 12 so as to be mutually repulsive to these members. This spring 13 causes the closing member 12 to be pressed in a direction of closing the opening 21.

Specifically, the closing member 12 is pressed in a leftward rotating direction of FIG. 4A by a resilient force of the spring 13. At normal times, the tip side of the closing member 12 locks in the opening 21 to cause a closed state. When the closing member 12 and the holder 10 are both nipped and pressed against the resilient force of the spring 13, the closing member 12 rotates rightward while the soft member 11 is sliding over the inner periphery of the holder 10, and the opening 21 becomes in an open state as depicted in FIG. 4B.

The grip space S is provided between the soft member 11 and the holding portion 20 as a space for gripping the personal ornament main body 2. The personal ornament main body 2 can be held as gripped in this grip space S toward the repulsive direction of the spring 13. Specifically, when the closing member 12 is pressed to a holder 10 side from a state of FIG. 4A and the closing member 12 moves into the inside of the holder 10 as in FIG. 4B, the grip space S is provided between the holding portion 20 and the closing member 12 via the soft member 11. To the holding portion 20 in this grip space S, the personal ornament main body 2 is attached as indicated by a two-dot-chain line of FIG. 4C. In this state, by releasing the pressing of the closing member 12 and the holder 10, the personal ornament main body 2 is gripped between the holding portion 20 and the soft member 11 by the resilient force of the spring 13.

The personal ornament main body 2 depicted in FIG. 1 is formed of a precious metal such as gold, silver, or platinum, another metal material, or the like in a long chain shape, and a general one can be used. The personal ornament main body 2 has chain elements 2a, and the chain element 2a at one end is attached in the attachment hole 25 of the clasp main body 1. To the chain element 2a at the other end, an appropriate ornamental member 50 is attached. This ornamental member 50 is formed larger than the grip space S of the clasp main body 1.

Note that while the soft member 11 is attached to the closing member 12 in the above-described embodiment, the soft member 11 may be attached to the holder 10 if the soft member 11 protrudes to the grip space S side to be able to attach and detach the personal ornament main body 2 between the holder 10 and the closing member 12. Even if provided on either side, the soft member 11 may be provided in a compact shape that can be arranged only on the grip space S side. In this case, although not depicted, for example, if a lock hole is provided in the closing member and a stopper piece that can be locked into this lock hole is provided in the soft member, this locking arrangement can position and fix the soft member to the closing member. According to this, the material of the soft member is reduced, and attachment is facilitated. Furthermore, since the folded portion for fixation to the soft member is not required to be provided to the spring, flexibility when the spring is processed is also improved.

The soft member 11 may be made of a material other than silicone if the material can produce appropriate friction resistance, and may be formed of rubber, for example. While the soft member 11 is formed to be long and is arranged over the closing member 12 approximately in its entirety in the present embodiment, the soft member 11 may be in a shape that can be arranged only a portion near the tip end side of the closing member 12 if the personal ornament main body 2 can be gripped.

Although not depicted, the personal ornament main body 2 is not limited to a chain shape and, for example, may have appropriate ornamental properties such as a string shape. The ornamental member 50 may be attachable to and detachable from the personal ornament main body 2, integrally provided, or omitted.

Furthermore, the clasp main body 1 can be provided in an appropriate shape or be provided with any ornament if the clasp main body 1 has a fastening structure of gripping the personal ornament main body 2 in the grip space S via the soft member 11 between the holding portion 20 and the closing member 12. The size of the grip space S may be appropriately set in accordance with the thickness of the personal ornament main body 2.

Next, the operation of the personal-ornament clasp of the present invention in the above-described embodiment is described.

To wear the above-described clasp main body 1 on the body, first in FIG. 1, in a state in which locking of the clasp main body 1 and the personal ornament main body 2 is released, the clasp main body 1 and the ornamental member 50 are positioned in front of the body (chest or belly side), and the personal ornament main body 2 is worn on the neck.

Next, the closing member 12 and the holder 10 of FIG. 3A and FIG. 4A are nipped by a finger, and these are pressed against the resilient force of the torsion coil spring 13, thereby causing the closing member 12 to rotate rightward about the pivotally attaching portion 28 as shown in FIGS. 4A to 4C, and the opening 21 is opened to such an extent that the upper surface side of the closing member 12 is substantially equal to a portion near the upper surface of the holder 10. Here, the closing member 12 and the holder 10 can be easily operated with a light force of a finger of one hand. In the torsion coil spring 13, as depicted in FIG. 4B, its free end 41 is deformed along a bowed portion on the inner periphery of the holder 10 to be able to exert a resilient force.

In this state, when an attachment portion of the personal ornament main body 2 is inserted from the opening 21 so as to fall down, the personal ornament main body 2 smoothly reaches the position of the holding portion 20 as sliding over the curved surface portion on the upper surface of the closing member 12. Thus, the retaining position of the personal ornament main body 2 with fingers is not required to be grasped and guided to the retaining position of the opening 21. After the personal ornament main body 2 is guided to the holding portion 20, the fingers are detached from the closing member 12 and the holder 10 to release pressing. Thus, the closing member 12 rotates leftward (counter-clockwise) about the pivotally attaching portion 28 by the resilient force of the spring 13, and the personal ornament main body 2 is gripped between the holding portion 20 and the soft member 11 in the grip space S. In this manner, while the closing member 12 and the holder 10 are opened with one hand, the personal ornament main body 2 is guided at its retaining position with the other hand from the opening 21, and can thus be easily attached with one touch.

After the personal ornament main body 2 is attached, with an elastic force and friction resistance the soft member 11 has in addition to the resilient force of the spring 13, the personal ornament main body 2 is firmly held between the soft member 11 and the holding portion 20, and sliding is also inhibited. With this, even if the thickness of each chain element 2a forming the personal ornament main body 2 is varied, a strong grip force can be exerted in accordance with its thickness to retain attachability. Thus, excellent versatility can be achieved. Even if an outer force is applied after attachment, a deviation between the clasp main body 1 and the personal ornament main body 2 and dropping thereof are prevented to maintain an attached state. After the personal ornament main body 2 is gripped between the soft member 11 and the holding portion 20, its gripped portion does not bulge outward, and compactability of the clasp main body 1 is maintained.

The clasp main body 1 has a smooth curved line shape as a whole, integration with the personal ornament main body 2 is improved, and the clasp main body 1 can ergonomically fit along the body together with this personal ornament main body 2. While the closing member 12 having the soft member 11 attached thereto is accommodated inside the holder 10, compactization can be achieved as the entirety of the structure is made narrower. Also, since there is no protrusion pointed outward, excellent beauty of function is achieved, for example, there is no obstruction to attachment, there is no snag in clothing or hair, and erroneous operation can also be prevented.

Furthermore, the locking position and the left and right lengths of the personal ornament main body 2 can be easily adjusted at the time of wearing or after wearing. In this case, as with the above-described case, the closing member 12 and the holder 10 are nipped by fingers to release the grip force to the personal ornament main body 2 by the pressing force and, in this state, the personal ornament main body 2 is slid to the holding portion 20 to allow adjustment of the attachment position. In this manner, adjustment can be easily made without removal of the personal ornament main body 2. By inhibiting sliding of the personal ornament main body 2 and the soft member 11, it is possible to inhibit damage of the personal ornament main body 2 and exhaustion of the soft member 11.

With the closing member 12 being always pressed by the torsion coil spring 13 in the closing direction, the closing member 12 is inhibited from loosening naturally to open the opening 21, thereby preventing dropping of the personal ornament main body 2. In this manner, since the personal ornament main body 2 is gripped by using the resilient force of the torsion coil spring 13, the gripping force is maintained even when the closing member 12 is repeatedly opened and closed. At normal times, the tip side of the closing member 12 locks from the inside of the opening 21, thereby preventing the closing member 12 from protruding outward even though the resilient force of the torsion coil spring 13 is applied to this closing member 12.

The soft member 11 is formed in a flat shape, and is structured to be fitted into the closing member 12 so as to be surrounded by the closing member 12. Thus, the soft member 11 can be fixedly attached at a predetermined position inside this closing member 12 simultaneously with fabrication of the closing member 12 by press working or the like. Furthermore, the plate-shaped portion 30 is formed as being in a long shape, and this plate-shaped portion 30 fits inside the closing member 12. This increases a contact area between the soft member 11 and the closing member 12 to prevent deviation of the soft member 11 after fixed attachment, and durability with respect to repeated use is enhanced. Furthermore, productivity, assembling capability, and workability are also improved.

Figure 6A:
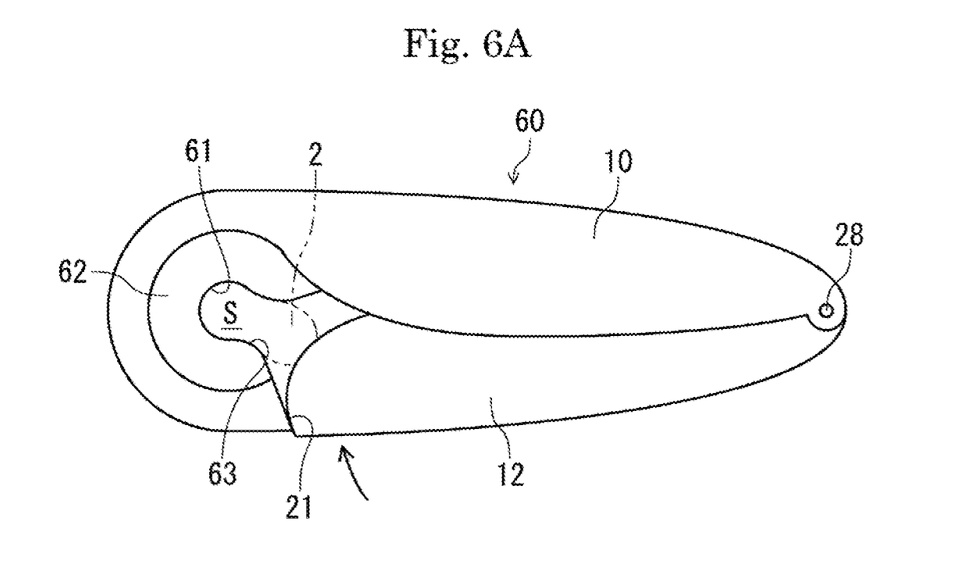
FIG. 6A and FIG. 6B are external views depicting a second embodiment of a personal-ornament clasp in the present embodiment.
Figure 6B:
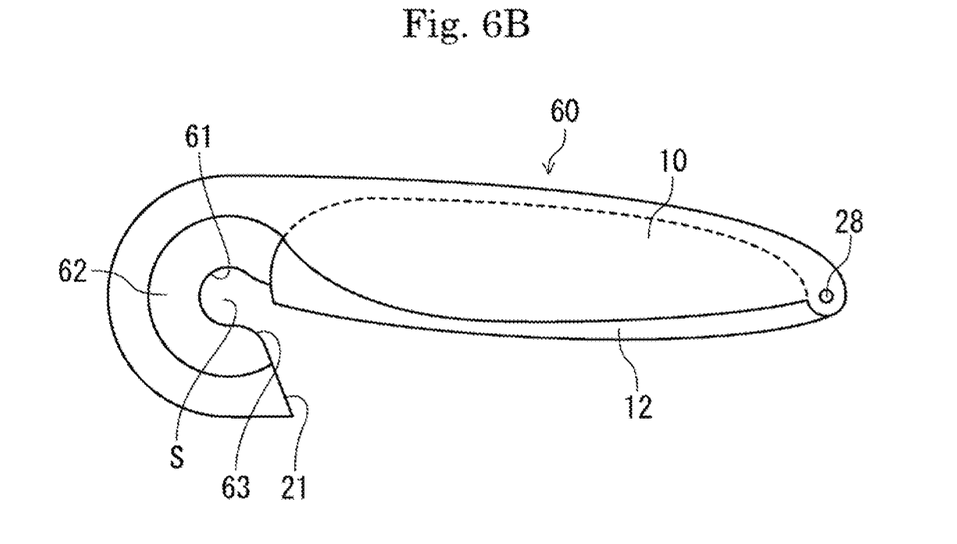

In FIGS. 6A to 6B, a second embodiment of the personal-ornament clasp in the present invention is depicted. Note that in the following embodiments, portions identical to those of the above-described embodiment are provided with the same reference characters and their description is omitted.

In this clasp main body 60, a groove-shaped region is formed inside a holding portion 61, and a soft member 62 made of silicone is accommodated in this groove-shaped region. On both edges of the groove portion, for example, a plurality of claw portions (not depicted) are provided. With these claw portions folded after accommodation of the soft member 62, the soft member 62 is attached inside the holding portion 61 in a state of being fixed therein.

On an inner peripheral side of the soft member 62 after attachment to the holding portion 61, a smooth round surface 63 is provided. This round surface 63 provides a gap for attaching the personal ornament main body 2. In this manner, in this embodiment, the soft member 62 is attached to the holder 10, and the grip space S where the personal ornament main body 2 is gripped is provided between the soft member 62 and the closing member 12.

Between the holder 10 and the closing member 12, a spring formed of a leaf spring is attached. The resilient force of this spring causes the closing member 12 to be pressed in a direction of closing the opening 21. With the closing member 12 pressed as being nipped to open and close the opening 21, as with the above-described case, the personal ornament main body 2 can be gripped between the closing member 12 and the soft member 62 of the holder 10. Depicted in FIG. 6A is a closed state of the clasp main body 60, and depicted in FIG. 6B is an open state of the clasp main body 60. With the closed state of FIG. 6A, as with the above-described embodiment, the personal ornament main body 2 can be firmly gripped.

When a leaf spring is used as a spring as in this example, a resilient force equivalent to that of the torsion coil spring can be exerted while cost is reduced compared with the torsion coil spring.

Figure 7A:
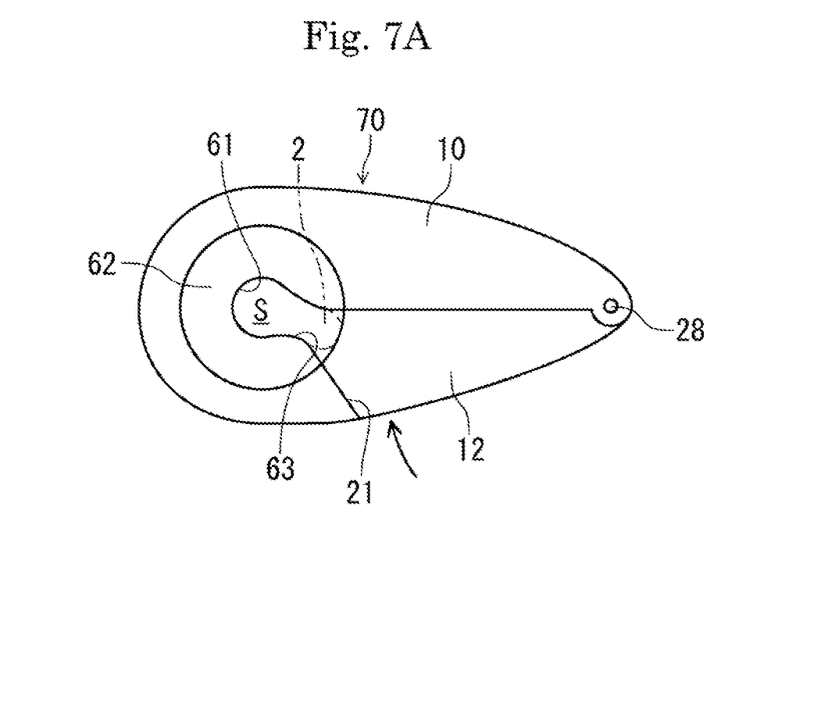
FIG. 7A and FIG. 7B are external views depicting a third embodiment of a personal-ornament clasp in the present embodiment.
Figure 7B:
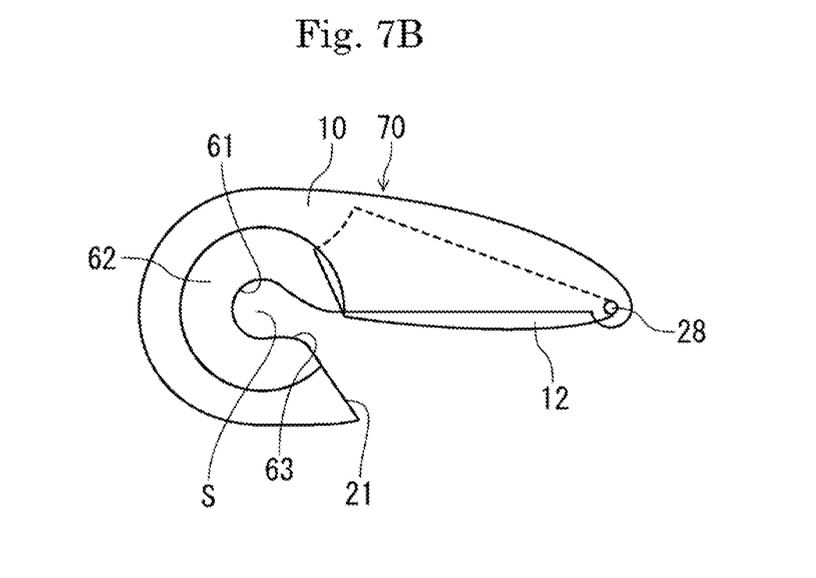

In FIGS. 7A to 7B, a third embodiment of the personal-ornament clasp in the present invention is depicted.

This clasp main body 70 is provided with the clasp main body 60 of FIGS. 6A to 6B which is short in a length direction. Also in this case, as depicted in a closed state of FIG. 7A and an opening state of FIG. 7B and as with the clasp main body 60 of FIGS. 6A to 6B, the closing member 12 can be pressed upon being nipped to open and close an open/close portion. In this case, compactization can be achieved compared with the clasp main body 60 of FIGS. 6A to 6B.

In the foregoing, while the embodiments of the present invention have been described in detail, the present invention solves the conventional inconvenience of the clasp, a user-satisfying clasp can be provided and, in particular, the present invention is not meant to be limited to the description of the embodiments and can be variously modified in a range not deviating from the spirit of the invention described in the scope of claims for patent of the present invention.

REFERENCE SIGNS LIST 1 clasp main body
2 personal ornament main body
10 holder
11, 62 silicone (soft member)
12 closing member
13 torsion coil spring (spring)
20, 61 holding portion
21 opening
28 pivotally attaching portion
50 ornamental member
S grip space

The invention claimed is:

1. A personal-ornament clasp comprising:
a holder having, on a first side, a holding portion where an elongated personal ornament main body can be held via an opening, wherein the holding portion has an arc-shaped curved surface, and the holder defines a U-shaped cross section;
a closing member pivotally attached to the holder via an attaching portion on a second end of the holder, wherein the closing member defines a second U-shaped cross section and has a curved upper surface;
a soft member attached to the closing member, wherein the soft member is formed in a flat shape, and is fitted in an interior space defined by the closing member, and wherein a first end of the soft member projects beyond an open end of the first end of the closing member for gripping the personal ornament main body, and the first end of the soft member defines a convex arc portion; and
a spring mounted to the attaching portion and accommodated inside the holder, the spring having a first end piercing the soft member so as to bias the closing member and the soft member toward a closed position,
wherein, in the closed position of the closing member, a first end portion of the curved upper surface of the closing member comes into contact with the holding portion and a grip space for gripping the personal ornament main body is secured between the convex arc portion of the soft member and an open end of the holding portion,
wherein the soft member is made of silicone or rubber having a friction resistance, and
wherein the closing member is rotatable about the attaching portion due to the resilient force of the spring such that any part of the personal ornament main body can be held between the convex arc portion and the holder portion due to the friction resistance of the convex arc portion.

2. The personal-ornament clasp according to claim 1, wherein the convex arc portion of the soft member is engaged with the open end of the closing member.

3. The personal-ornament clasp according to claim 1, wherein the soft member extends through the interior space defined by the closing member such that a second end of the soft member is disposed adjacent the attaching portion.

* * * * *